United States Patent [19]
Tomizawa et al.

[11] Patent Number: 5,707,516
[45] Date of Patent: Jan. 13, 1998

[54] COLUMN PACKINGS FOR LIQUID CHROMATOGRAPHY

[75] Inventors: Akira Tomizawa, Iruma; Akinori Shigematsu, Kawagoe; Hisashi Matsuda, Kodaira; Naoki Koga; Keisuke Hisada, both of Kitakyushu, all of Japan

[73] Assignee: Snow Brand Milk Products Co., Ltd., Sapporo, Japan

[21] Appl. No.: 722,634

[22] Filed: Sep. 27, 1996

Related U.S. Application Data

[63] Continuation-in-part of Ser. No. 277,213, Jul. 14, 1994, abandoned.

[51] Int. Cl.$^6$ ........................................ B01D 15/08
[52] U.S. Cl. ................................ 210/198.2; 210/502.1; 210/656; 502/408
[58] Field of Search ........................ 210/635, 656, 210/198.2, 502.1; 502/408

[56] References Cited

FOREIGN PATENT DOCUMENTS

| 38752 | 1/1991 | Japan | 210/198.2 |
| 4183393 | 6/1992 | Japan | 210/198.2 |

OTHER PUBLICATIONS

PTO Translation of Japan Kokai 4-183393, PTO 95-5292, entire document, Jul. 1995.

PTO Translation of Japan Kokai 3-8752, PTO 95-5279, entire document, Jul. 1995.

*Primary Examiner*—Ernest G. Therkorn
*Attorney, Agent, or Firm*—Townsend & Banta

[57] ABSTRACT

Column packings for liquid chromatography comprising porous granules which have hydrophilic surfaces prepared by calcining a crystalline clay mineral having a fibrous structure. Median pore diameter of the porous ceramic granules is in the range of from 0.001 μm to 0.01 μm. The crystalline clay mineral can be sepiolite or attapulgite. The column packings for liquid chromatography have high mechanical strength, are presssure resistant and very stable to elutants having a high pH value and/or a high polarity so that the separating characteristics thereof are not changed even after long use.

7 Claims, 6 Drawing Sheets

COLUMN PACKINGS FOR LIQUID CHROMATOGRAPHY

CROSS REFERENCE TO A RELATED APPLICATION

This is a continuation-in-part patent application of application Ser. No. 08/277,213 filed Jul. 19, 1994, now abandoned.

BACKGROUND OF THE INVENTION

1. Field of the Invention

The present invention relates to column packings for liquid chromatography and methods for separating materials using the column packings. More particularly, the present invention relates to column packings for liquid chromatography comprising porous ceramic granules having a hydrophilic surface which are prepared by calcining a crystalline clay mineral having a fibrous structure and methods for separating materials using the column packings.

2. Prior Art

Liquid chromatography is a chromatography utilizing liquid in the mobile phase. Various types of liquid chromatographies have been developed for separation.

Liquid chromatography is classified depending on the principle of the separation into ion-exchange chromatography, partition chromatography, adsorption chromatography, gel permeation chromatography, affinity chromatography or the like. Also, it is classified depending on the method of the operation into downward flow method, upward flow method, high performance liquid chromatography or the like.

Among them, high performance liquid chromatography (HPLC) has high separating performance and the throughput speed is very high so that it can be spread rapidly. The HPLC uses essentially uniform and extremely fine spherical granules as the stationary phase (which is referred to as "column packings" hereinafter).

As conventional column packings for HPLC, besides silica gel, modified silica gels in which silica gel is modified with an octadecyl group or an amino group or the like, ion exchange resin comprising synthetic polymer such as polystyrene and polyvinyl and column packings comprising natural polymer or the like have been used.

Silica gel has been used for separating lipid related materials as column packings for adsorption chromatography utilizing excellent adsorption performances of silanol groups existing in a large number on internal surfaces of pores. However, silica gel may be easily dissolved in water and has a very low resistance to high pH eluent. Thus, it could hardly be used for separating samples using such eluent.

On the other hand, as inorganic column packings, active china clay and synthetic zeolite have been conventionally used for separation by adsorption or the like. They had, however, no sufficient separation performances as column packings for chromatography and could not be used for HPLC.

In addition, column packings for chromatography prepared from hydroxy apatite as raw material which was recently developed has a high mechanical strength and low solubility in eluent and thus they are good column packings. They, however, do not adsorb materials having no charge such as lipids although they adsorb materials having charged functional groups such as proteins. Accordingly, they are not proper for separating lipid related materials.

Under such circumstances, there is need for a development of column packings which have high resistance to eluent, having high polarity and a high pH value and which can separate lipid related materials in high efficiency.

On the other hand, techniques of using ceramics have made rapid progress recently and ceramics having various functions have been developed.

For example, Japanese Patent Unexamined Publication No.Hei-3-8752 discloses a technique of preparing porous ceramics by calcining a raw material containing clay minerals having a fibrous crystal structure such as sepiolite.

In addition, Japanese Patent Unexamined Publication No.Hei-4-183393 discloses a technique of fixing enzyme into such porous granules.

However, use of the porous ceramics as column packings for chromatography has not been known.

SUMMARY OF THE INVENTION

Under such circumstances, an object of the present invention is to provide column packings for liquid chromatography which are very stable to eluent having high polarity and/or pH values and may be used for separating lipid related materials.

Another object of the present invention is to provide methods for separating lipids using the column packings for liquid chromatography.

Still another object of the present invention is to provide methods for separating vitamins using the column packing for liquid chromatography.

To attain the objects of the present invention, the inventors have researched and have found that if porous ceramics granules which have a hydrophilic surface and are prepared by calcining crystalline clay mineral having a fibrous structure are used as column packings for liquid chromatography, the ceramics granules are very stable to eluent having high polarity and/or a high pH value and can separate lipid related materials which had been difficult to separated.

Thus, in accordance with the present invention there is provided column packings for liquid chromatography comprising porous ceramics granules which have hydrophilic surfaces that are prepared by calcining crystalline clay mineral having fibrous structure.

In accordance with the present invention there is also provided column packings wherein the fibrous structure is a fibrous crystal structure containing parallelepiped intra crystalline tunnel along the fiber.

In accordance with the present invention there is also provided column packings wherein the median core diameter of the porous ceramics granules is in the range from 0.001 μm to 0.1 μm.

In accordance with the present invention there is also provided column packings wherein the crystalline clay mineral having a fibrous structure is sepiolite or attapulgite.

In accordance with the present invention there is also provided column packings wherein $SiO_2$ content of the porous ceramics granule is 60 wt. weight % or more weight.

In accordance with the present invention there is also provided column packings wherein MgO content of the porous ceramics granule is 30 wt. weight % or less weight.

In accordance with the present invention there is also provided column packings wherein $SiO_2$ content of the porous ceramics granule is 60 wt. weight % or more and MgO content of the porous ceramics granule is 30% or less.

In accordance with the present invention there is also provided a method for separating lipids comprising the steps of: filling the column packing for liquid chromatography; injecting a sample containing lipids; and passing an eluent through the column to separate and elute the lipids in the sample.

In accordance with the present invention there is also provided a method for separating vitamins comprising the steps of: filling the column packing for liquid chromatography; injecting a sample containing vitamins; and passing an eluent through the column to separate and elute the vitamins in the sample.

DETAILED DESCRIPTION OF THE PRESENT INVENTION

The crystalline clay mineral having a fibrous structure used as raw materials of the present invention may include sepiolite, attapulgite, palygorskite.

Sepiolite is a clay mineral having a chemical formula of $Mg_8Si_{12}O_{30}(OH_2)_4 \cdot 6$ to $8H_2O$. Among clay minerals, sepiolite has a different fibrous crystalline structure from minerals such as kaolinite, montmorillonite having a layered structure. The crystal contains uniform size palallelepiped intracrystalline tunnels along the fiber and their cross section is about $1.35 \times 0.67$ nm$^2$. Aggregate of sepiolite has a large pore volume having peaks of pore sizes of 0.001 μm and 0.02 μm. It is utilized for many usages such as decoloring agent, water absorption agent, deodorizing agent, oil absorption agent.

Attapulgite is a crystalline clay mineral having a fibrous crystal structure containing uniform size intracrystalline tunnels parallel with the fiber as sepiolite and has a chemical formula of $Mg_5Si_8O_{20}(OH)_2(OH_2)_4 \cdot 4H_2O$. It is utilized for many usages such as adsorbing agent, slurry for drilling. Attapulgite is also referred to as palygorskite.

Various clay minerals such as talc containing $SiO_2$ and MgO as principal components, and kaolinite, montmorillonite containing $SiO_2$ as a principal component. Other than the above crystalline clay mineral having a fibrous crystal structure containing parallelepiped intracrystalline tunnel along the fiber may be used as raw material for the column packings for liquid chromatography of the present invention.

The column packings for chromatography of the present invention may be prepared, for example, by a method described hereinafter.

The column packings may be prepared by the steps of crushing the raw material described above, then granulating such as by a rolling granulation to have spherical granules having a predetermined grain size, carrying out the first calcination comprising a calcination at a temperature of 100° to 1200° C., treating it by dipping it into a mineral acid such as hydrochloric acid or sulfuric acid to remove alkali oxides, carrying out the second calcination comprising a calcination at a temperature of 100° to 1200° C., and then carrying out a grain size granulation by classifying to have a predetermined grain size by means in such as levigation, air elutriation and sieving.

The above method for preparing the column packings will be detailed by an example using sepiolite as a raw material.

First, after crushing ceramics raw material by a conventional method, it is granulated. The granulation is preferably carried out to have the raw material of spherical shapes.

The granulation method may include an extrusion granulation of clay raw material comprising sepiolite powder added by water, a rolling granulation comprising dispersion granulation of sepiolite power and small amount of water in a mixer, and spray drying. Among them, the rolling granulation is the preferable method of granulation into a spherical shape. In addition, the spray drying method is preferable when it is desired to have small grain size granules.

When carrying out the spray drying method, a slurry in which the raw material sepiolite powder is dispersed in water or an organic solvent is previously prepared. The slurry is preferably deflocculated as much as possible. There are many apparatus for carrying out the spray drying method but a mechanism of spraying slurry in a form of fine droplet is important. Any known method such as a method rotating a disc, a method spraying slurry from a nozzle under pressure, a method using two-fluid spray nozzles may be used in the present invention. The grain diameters can be controlled by the selection of the method or a system.

The grain size of the raw material obtained by granulation is preferably in the range from 1 to 100 μm. If the grain size is less than 1 μm, it is not preferable since clogging easily occurs and a high pressure is required when these materials are used as HPLC column packings. However theoretical plate numbers may be increased by increasing surface area per unit amount of the column packings, i.e. decreasing grain size in order to increase the area contact with samples. On the other hand, if the grain size is more than 100 μm, the separating efficiency decreases and thus it is not preferable.

In order to lead strength to the granules thus prepared, an organic binder such as cellulose and inorganic binder such as water-glass may be previously added to the slurry.

Then, the prepared granules are calcined first. The first calcination is in order to avoid the change of the shape of the granules during the subsequent acid treatment process. The first calcination temperature is preferably in the range from 100° to 1200° C. If the calcination temperature is less than 1200° C., deformation of the shape easily occurs. If the calcination temperature is more than 1200° C., the removal of impurities owing to the acid treatment is difficult and thus it is not preferable.

Figure 1:
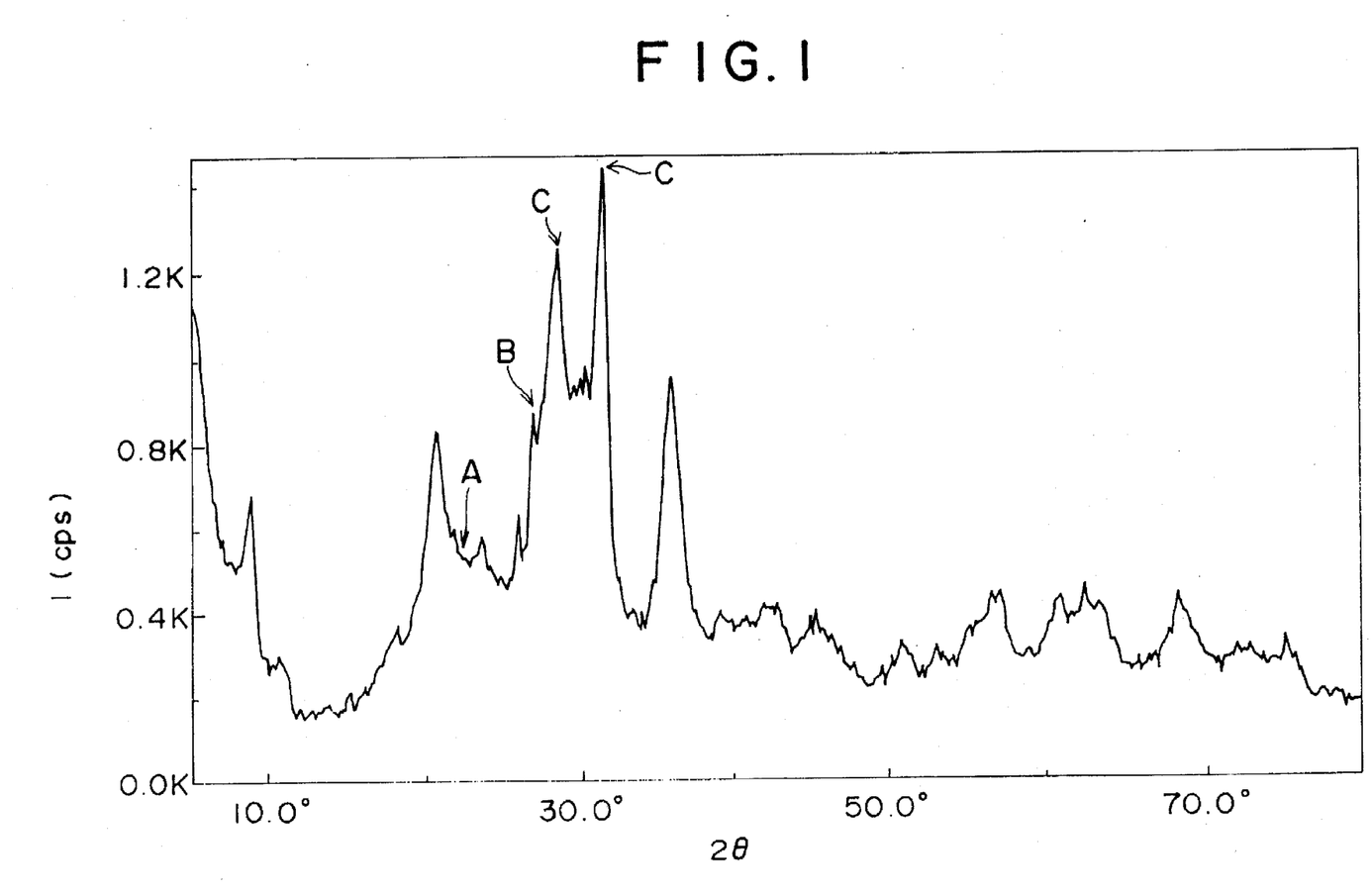
FIG. 1 shows an X ray diffractive pattern of sepiolite first-calcined. "A" corresponds to a peak of crystobalite, "B" corresponds to a peak of quartz, and "C" corresponds to peaks of enstatite.

When sepiolite is calcined first, it becomes metasepiolite with the adsorbed water and the water of crystallization deleted. When it is further treated thermally at a higher temperature, it becomes crystal such as enstatite, quartz, crystobalite. The X ray diffraction data at the time is shown in FIG. 1.

Then an alkali metal oxide or an alkali earth metal oxide contained in sepiolite is removed by acid treatment.

Namely, sepiolite raw material usually contains many impurities and contains MgO, $Al_2O_3$, $Fe_2O_3$, CaO, $K_2O$, $Na_2O$ or the like besides the principle component $SiO_2$ even after the purification though the amounts are very small. These impurities are preferably removed as much as possible. Fortunately, almost all impurities are alkali metal oxides such as MgO or alkali earth metal oxides and are soluble in acid, consequently they can be removed by by dipping in acid solution.

As a method for removing such impurities by acid treatment, a technique of eluting components other than principal component $SiO_2$ by dipping sepiolite ceramics calcined provisionally at 800° C. in hydrochloric acid, pH 2 for 24 hours is disclosed in Japanese Patent Unexamined Publication No. Sho 4-183393. In the present invention, such acid treatments can also be carried out.

Figure 2:
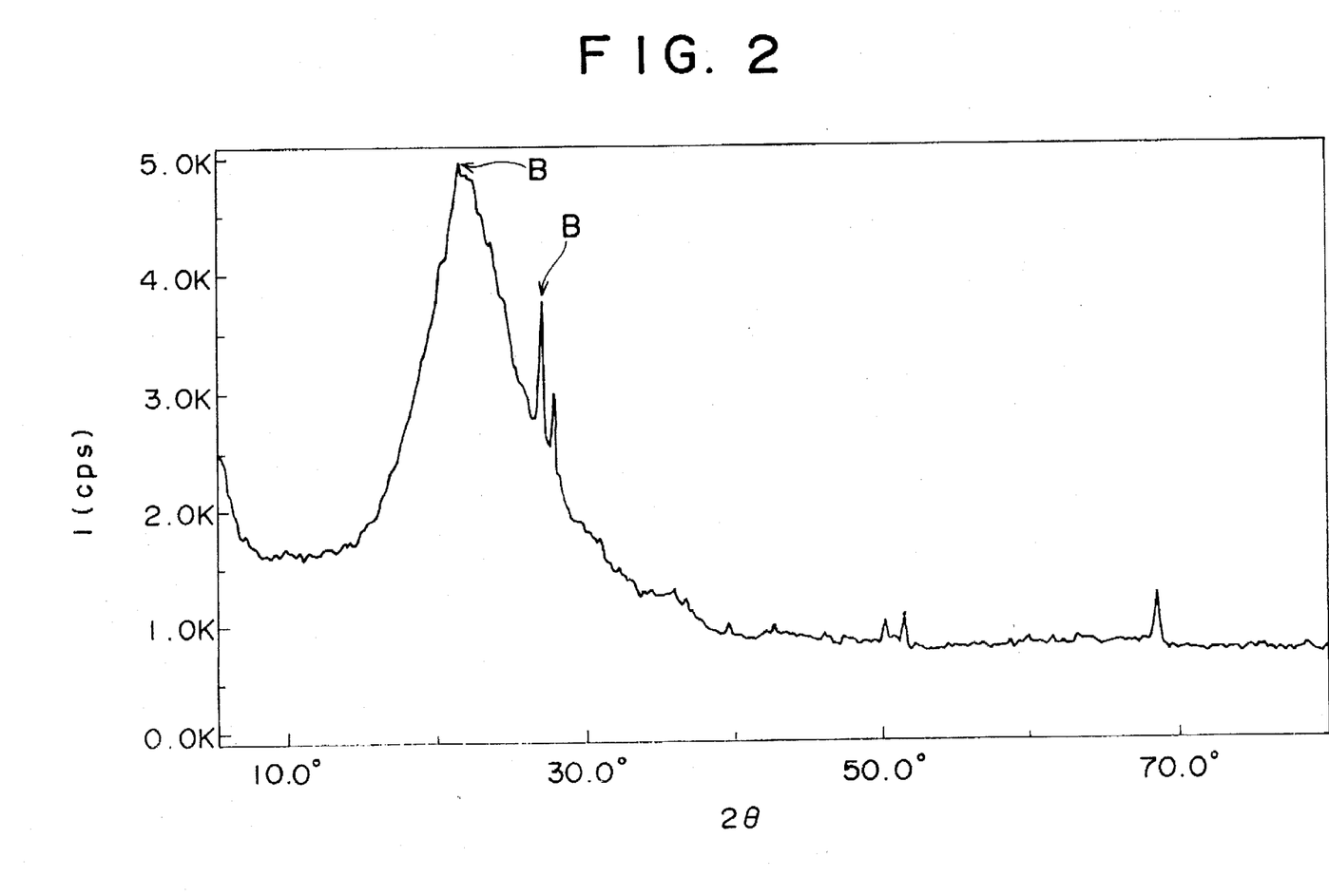
FIG. 2 shows an X ray diffractive pattern of sepiolite treated by an acid. "B" corresponds to peaks of quartz and a broad peak appearing at from 15° to 30° corresponds to a peak of non-crystalline $SiO_2$.

FIG. 2 shows an X ray diffraction data of the sepiolite in which non-crystalline $SiO_2$ is formed by removing MgO which has been contained in crystal when zeolite having the X ray diffraction data after the first calcination shown in FIG. 1 is treated by acid.

The non-crystalline $SiO_2$ may be formed by removing MgO from sepiolite, metasepiolite or enstatite crystal to destroy crystal structure.

The acid solution may include mineral acids such as hydrochloric acid, sulfuric acid, phosphoric acid.

The lower the pH and the higher the concentration the acid solution, the faster the alkali metal oxides such as MgO and alkali earth metal oxides can be removed. Although the performance of column packings depends on their composition, the composition of final column packings may be controlled by the acid treatment. The $SiO_2$ ratio is preferably controlled at from 60 to 100 wt. weight %.

In addition, by the removal of MgO, the space previously occupied by the eluted MgO was eluted becomes new pores. The pore size is about 0.1 μm or less. The specific surface area increased by the new pore formation by the removal of about 25% MgO is about 100 $m^2$ or more per 1 g of the column packings. Thus, the new pore formation is a factor causing an improvement in performance as column packings. However, preferably a certain amount of MgO remains rather than all MgO being removed from the view point of the characteristics as HPLC stationary phase. The particularly preferable amount of MgO contained in the porous ceramics is 30 weight % or less.

With the present invention, the pore formed by the removal of MgO by acid treatment may have a uniform shape and uniform pore size although with the conventional methods for preparing ceramics, the pore formation is changed depending on calcination conditions and ceramics having a uniform pore size cannot be obtained.

After treatment with acid solution, a further calcination is carried out in order to produce high mechanical strength.

The second calcination temperature must be set to avoid decrease of the pore volume, and is preferably in the range from 100° to 1200° C., more preferably in the range of from 800° to 1100° C. If the calcination temperature is less than 100° C., the mechanical strength of the column packings are decreased. If the calcination temperature is more than 1200° C., the pores decreases and thus are not preferable.

Figure 3:
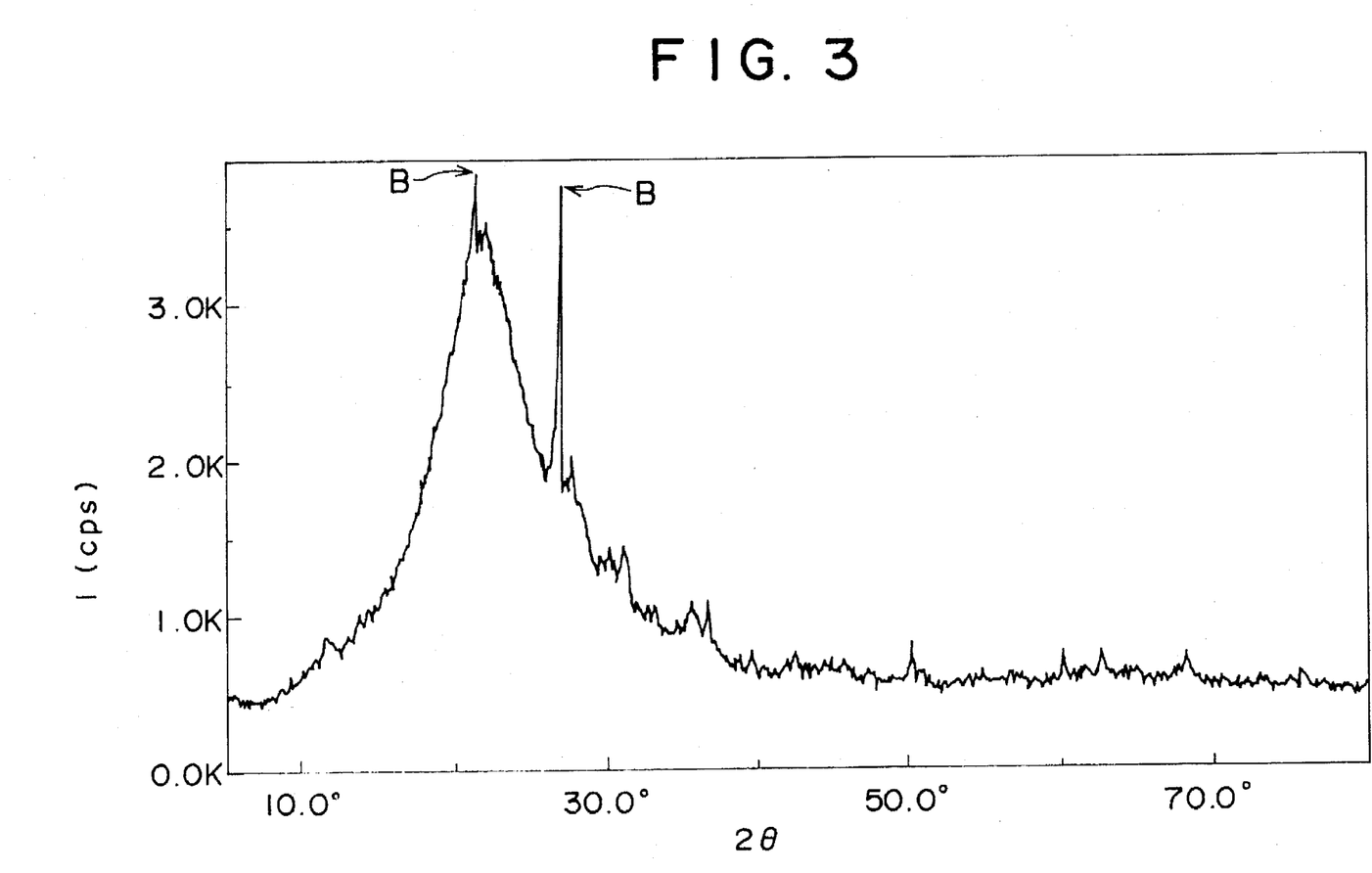
FIG. 3 shows an X ray diffractive pattern of sepiolite second-calcined. "B" corresponds to peaks of quartz and a broad peak appearing at from 15° to 30° corresponds to a peak of non-crystalline $SiO_2$.

After the second calcination is carried out, sintering increases and the amount of the non-crystalline $SiO_2$ crystallizing increases. These changes are shown in an X ray diffraction pattern in FIG. 3.

The column packings of the present invention contain non-crystalline $SiO_2$ and crystalline $SiO_2$ as principal components. The non-crystalline $SiO_2$ has a high surface energy and may be easily bonded to water to form silanol groups that are hydrophilic groups. The hydrophilic group fulfill the important functions of the column packings of the present invention.

The final pore size and pore volume of the column packings are determined depending on the calcining conditions after granulation, and treatment conditions in an acid solution and the calcining conditions after the acid solution treatment. The setting of the conditions are important since characteristics of column packings depends on the pore distribution.

In particular, median pore diameter of the column packings of the present invention is important. If the median pore diameter is more than 0.1 μm, the separating ratio decreases and thus is not preferable. If the pore size is less than 0.001 μm, clogging of the pores occurs which causes scattering of separating data and thus is not preferable. Accordingly, the median pore diameter of the column packings of the present invention is preferably in the range of from 0.001 μm to 0.1 μm.

Although with the above procedures column packings may be prepared, if a uniform grain size is not obtained, a predetermined uniform grain size may be obtained by means of levigation, air elutriation or screening.

The column packings having uniform grain size filled into a column may be used as a column for separation.

The column packings may be introduced into a column and may be used to carry out liquid chromatography like conventional column packings for liquid chromatography.

The column packings of the present invention may be used for analyzing protein, enzyme, nucleic acid, glycoside, vitamins, phospholipid, glycolipld, triglyceride, fatty acid. In particular, the column packings of the present invention exhibit an excellent function in the separation of fat-soluble vitamins, phospholipid, glycoside, triglyceride, fatty acid.

Eluent used in the separation may include conventional solutions such as an acetonitrile/phosphate buffer solution, hexane/ethanol.

The column packings for liquid chromatography of the present invention can separate polar materials, which could not be separated efficiently with a conventional HPLC, using an eluent having high polarity in a short time. The column packings are thus useful as column packings for preparative chromatography and analytical chromatography.

In addition, the column packings for liquid chromatography of the present invention have a high mechanical strength and are pressure resistant and very stable to eluent having a high pH value and/or a high polarity so that the separating characteristics thereof are not changed even after a long time use.

EMBODIMENTS

The present invention will be detailed by the following non-limiting examples.

Example 1

(a method by a rolling granulation)

1.5L of water was added to 3 kg of sepiolite grains having a grain size of 325 mesh or less. The mixture was granulated into spherical granules having a grain size of 50 μm by a rolling granulation with a mixer. After calcining the spherical granules at 900° C. for four hours, it was treated by dipping in 3N hydrochloric acid for 96 hours to remove alkali oxides. After further calcining the granules at 1020° C. for four hours, 2.5L of spherical porous ceramics of 45 to 53 μm was prepared by screening. The composition of the ceramics was determined by a fluorescent X ray analysis. The composition was: $SiO_2$ 97.31%, MgO 0.39%, $Fe_2O_3$ 0.23%, $Al_2O$ 1.39%, CaO 0.08%, $K_2O$ 0.60% and trace of $Na_2O$.

The pore distribution of the column packings was further determined by a mercury penetration method. The results are shown in Table 1.

TABLE 1

| True specific gravity | (g/cm³) | 2.0091 |
|---|---|---|
| Specific gravity | (g/cm³) | 0.9901 |
| Pore volume (ml/g) | Total | 0.5423 |
| | - 0.01 μm | 0.0055 |
| | 0.01–0.03 μm | 0.1052 |
| | 0.03–0.05 μm | 0.1967 |
| | 0.05–0.07 μm | 0.0855 |
| | 0.07–0.1 μm | 0.0371 |
| | 0.1–0.3 μm | 0.0189 |
| | 0.3–0.5 μm | 0.0109 |
| | 0.5–0.7 μm | 0.0054 |
| | 0.7–1 μm | 0.0045 |
| | 1 μm - | 0.0726 |
| Specific surface area (m²/g) | Total | 50.9331 |
| | 0.01 μm - | 48.8983 |
| Median pore diameter (μm) | volume | 0.0452 |
| | surface area | 0.0301 |

(2) 1.5L of water was added to 3 kg of sepiolite grains having grain size of 325 mesh or less. The mixture was granulated into spherical granules having a grain size of 50 μm by a rolling granulation with a mixer. After calcining the spherical granules at 900° C. for four hours, it was treated by dipping in 3N hydrochloric acid for 0.25 hours to remove alkali oxides. After further calcining the granules at 1020° C. for four hours, 2.5L of spherical porous ceramics of 45 to 53 μm was prepared by screening.

The composition of the ceramics was determined by a fluorescent X ray analysis. The composition was: $SiO_2$ 65.10%, MgO 28.12%, $Fe_2O_3$ 1.42%, $Al_2O_3$ 2.75%, CaO 1.83%, $K_2O$ 0.67% and $Na_2O$ 0.11%.

The pore distribution of the column packing was further determined by a mercury penetration method. The results are shown in Table 2.

TABLE 2

| True specific gravity | (g/cm³) | 3.0392 |
|---|---|---|
| Specific gravity | (g/cm³) | 1.1823 |
| Pore volume (ml/g) | Total | 0.5168 |
| | - 0.01 μm | 0.0152 |
| | 0.01–0.03 μm | 0.1333 |
| | 0.03–0.05 μm | 0.3141 |
| | 0.05–0.07 μm | 0.0237 |
| | 0.07–0.1 μm | 0.0076 |
| | 0.1–0.3 μm | 0.0096 |
| 0.3–0.5 μm | | 0.0019 |
| 0.5–0.7 μm | | 0.0016 |
| 0.7–1 μm | | 0.0011 |
| 1 μm - | | 0.0087 |
| Specific surface area | Total | 66.1217 |

TABLE 2-continued

| (m2/g) | 0.01 μm - | 58.4888 |
|---|---|---|
| Median pore diameter (μm) | volume | 0.0354 |
| | surface area | 0.0302 |

Example 2

(a method by a spray drying)

(1) 5L of water was added to 2 kg of sepiolite grains having grain size of 325 mesh or less. The mixture was stirred for 30 minutes with a homogenizer to have a dispersion. At the time, 40 g of ammonium carbonate was added simultaneously as deflocculant. 1.4 kg of granulated spherical granules of 50 μm were obtained under the conditions of disc revolution numbers of 8000 rpm, slurry feed rate of 50 cc/min, hot air temperature of 200° C. and exhaust temperature of 110° C. After calcining the spherical granules a calcining temperature of 900° C. for four hours, the granules were treated by dipping into 3N hydrochloric acid for 96 hours to remove alkali oxides. After further calcining the granules at 1020° C. for four hours, 1.4 kg of spherical porous ceramics of 50 μm was prepared.

(2) 5L of water was added to 250 g of sepiolite grains having grain size of 325 mesh or less. The mixture was stirred for 30 minutes with a homogenizer to have a dispersion. At that time, 5 g of ammonium carbonate was added simultaneously a deflocculant. 150 g of granulated spherical granules of 5 μm were obtained under the conditions of disc revolution numbers of 15000 rpm, slurry feed rate of 50 cc/min, hot air temperature of 200° C. and exhaust temperature of 110° C. After calcining the spherical granules a calcining temperature of 900° C. for four hours, the granules were treated by dipping a 3N hydrochloric acid for 96 hours to remove alkali oxides. After further calcining the granules at 1020° C. for four hours, 150 g of spherical porous ceramics of 5 μm was prepared.

Example 3

Figure 4:
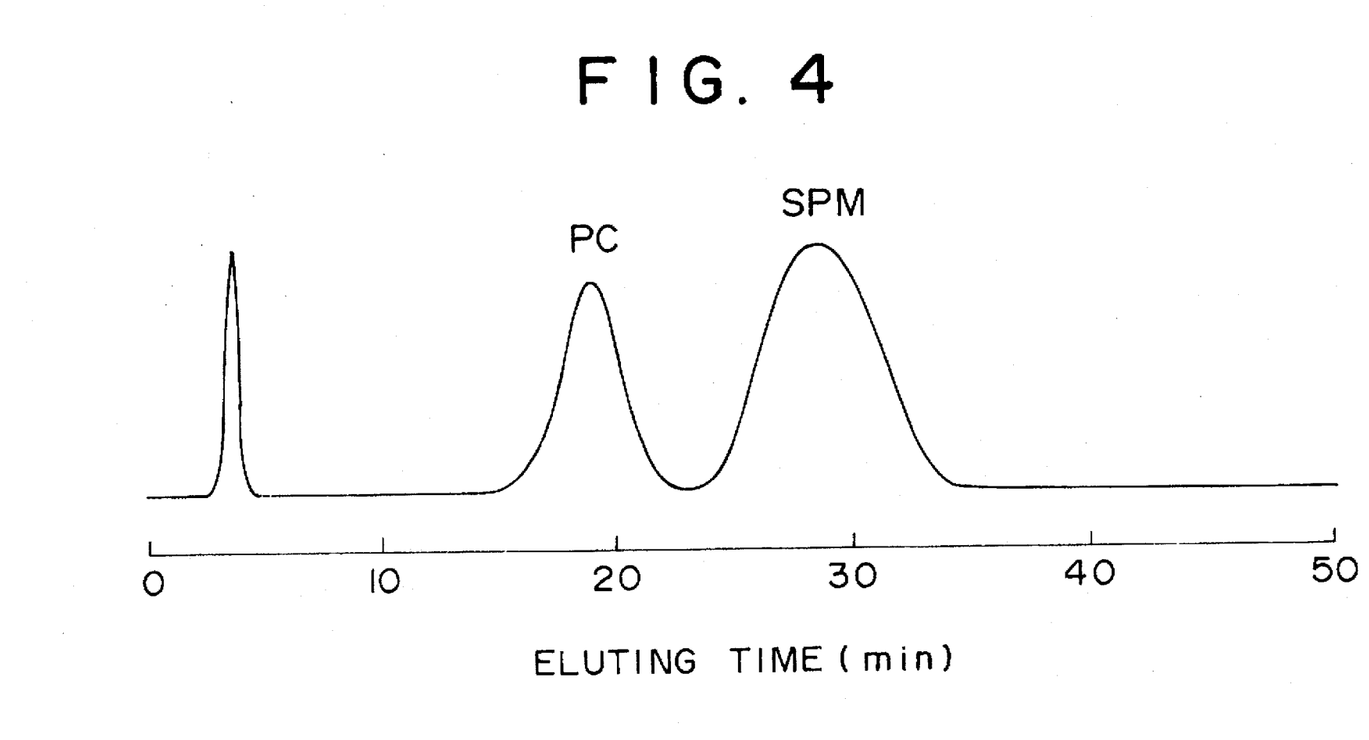
FIG. 4 shows a chromatogram of phosphatidylcholine (PC) and sphingomyelin (SPM) using the column packings for liquid chromatography of the present invention.

The spherical porous ceramics prepared in Example 1(2) was dispersed in solution of methanol/glycerin (1:1) and slurry-filled into a column having an inner-diameter of 3 mm and a length of 300 mm. Eluent in which 1 part by weight of 10 mM phosphorate buffer solution (pH 2.6) containing 100 mM sodium perchlorate and 9 parts by weight of acetonitrile was mixed, and then passed through the column at a flow rate of 1 ml/min to equilibrate the column sufficiently. 5 μl of a sample containing 10 mg of phosphatidylcholine (PC) and 50 mg of sphingomyelin (SPM) dissolved in 60 ml of ethanol was injected into the column and phospholipids eluted from the column were detected with a UV detector at 205 nm. The column temperature was 45° C. The results of the detection is shown in FIG. 4. As shown in FIG. 4, PC and SPM were satisfactorily separated and eluted after 18.9 min and 28.5 min, respectively.

Example 4

Figure 5:
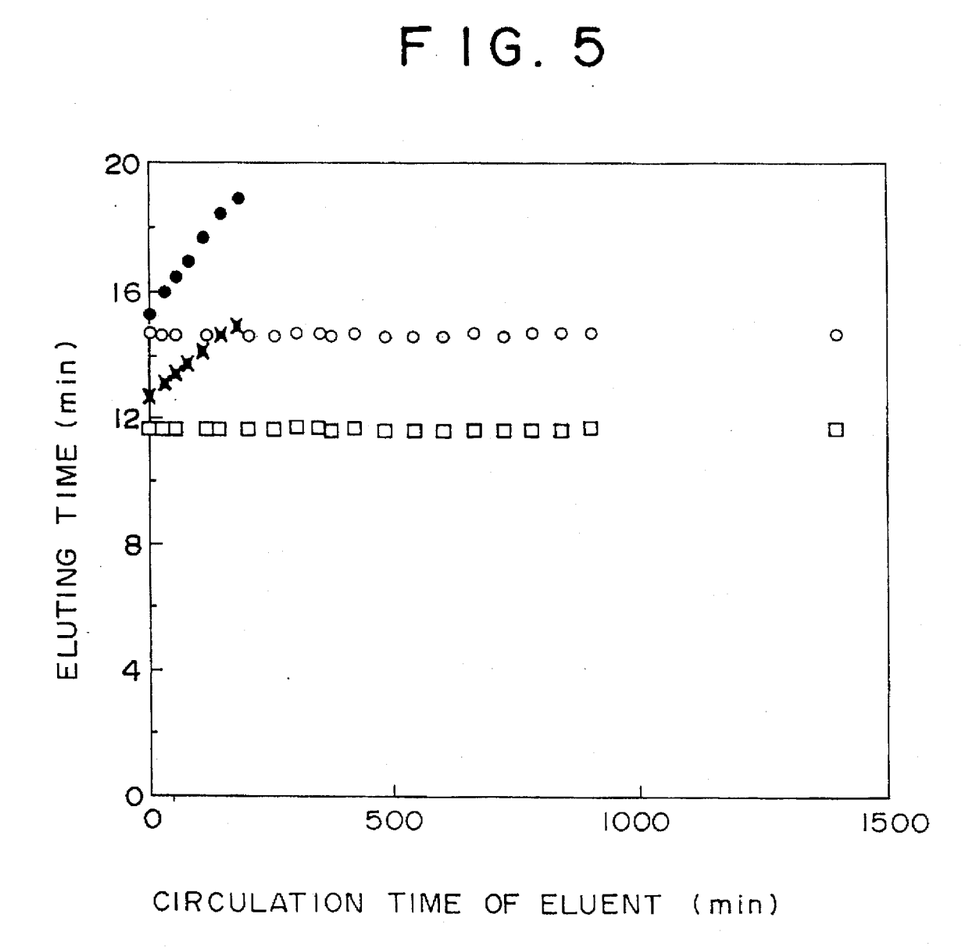
FIG. 5 shows variations of the retention time by continuous use of HPLC columns using silica gel (SC) and the column packings of the present invention. "○" shows the retention time of sphingomyelin by the present invention, "□" shows that of phosphatidylcholine of the present invention, "●" shows that of sphingomyelin by silica gel column and "x" shows phosphatidylcholine by the silica gel column, respectively.

Eluent in which 14 parts by weight of 10 mM phosphoric buffer solution (pH 2.6) containing 100 mM sodium perchlorate and 86 parts by weight of acetonitrile was mixed was flown through the column used in Example 2 at a flow rate of 1 ml/min to equilibrate the column sufficiently. 5 μl of a sample containing 10 mg of phosphatidylcholine (PC) and 50 mg of sphingomyelin (SPM) dissolved in 60 ml of ethanol was injected into the column and phospholipids eluted from the column were detected with a UV detector at 205 nm. After all phospholipids were eluted, the procedure of injecting the sample into the column was repeated, the changes of the retention times of each phospholipids were checked. As a comparative example, commercially available silica gel was filled in a column as described in Example 2, and the sample was similarly injected repeatedly. The changes of the retention time of phospholipids were observed. The retention times of phospholipids in each columns are shown in FIG. 5. The ceramics packed column showed no changes of the retention times of phospholipids after 1400 hours, although the silica gel column showed a clear increase of the retention time with the flowing time of the eluent.

Example 5

Figure 6:
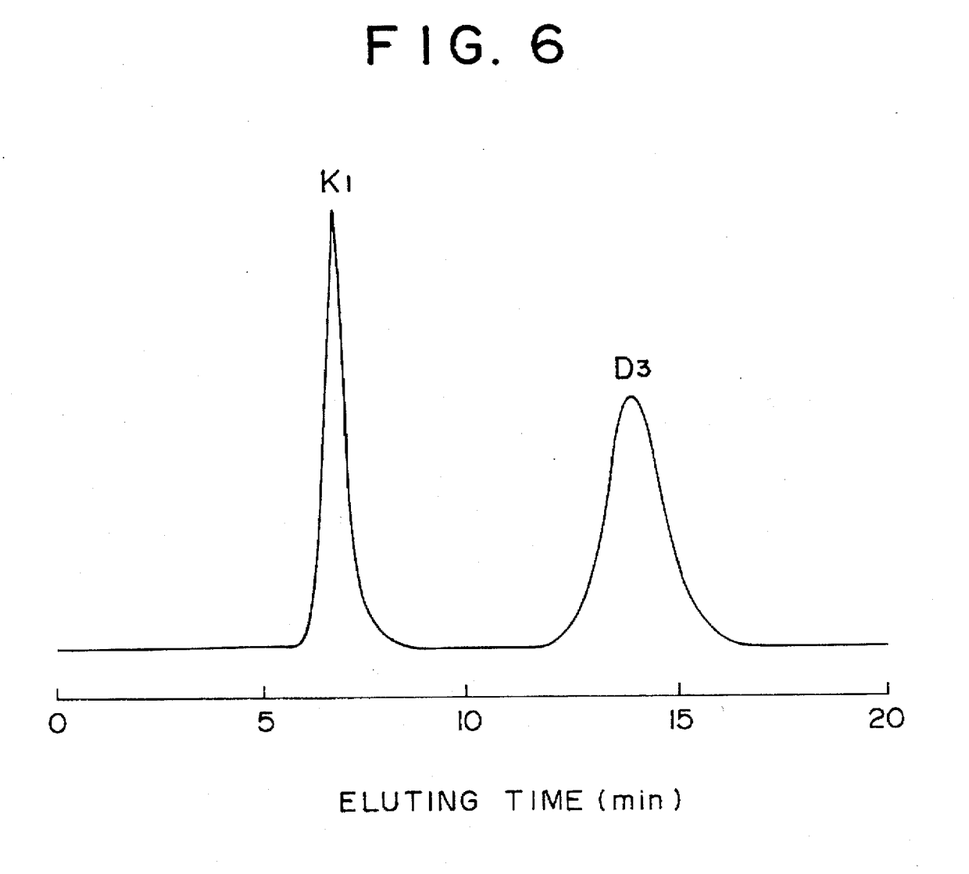
FIG. 6 shows chromatogram of vitamin $K_1$ and vitamin $D_3$ using the column packings for liquid chromatography of the present invention.

The spherical porous ceramics prepared in Example 1(2) was dispersed in a solution of methanol/glycerin (1:1) and slurry-filled into a column having an inner-diameter of 3 mm and a length of 300 mm. Eluent of hexane/ethanol (99.5/0.5) was flown through the column at a flow rate of 1 ml/min to sufficiently equilibrate the column. 10 μl of a sample containing 100 mg of vitamin $K_1$ and 100 mg of vitamin $D_3$ dissolved in 1 ml of hexane was injected into the column and the vitamins eluted from the column were detected with a UV detector at 245 nm. The column temperature was 20° C. The results of the detection are shown in FIG. 6. As shown in FIG. 6, the vitamin $K_1$ and the vitamin $D_3$ were satisfactorily separated and eluted after 6.6 min. and 13.8 min., respectively.

As described above, the column packings for liquid chromatography provided by the present invention are very stable to eluent having a high pH value and eluent having a high polarity. The separating characteristics are not changed even after long use, and it can separate samples in high efficiency.

The column packings for liquid chromatography of the present invention can separate lipid related materials which could not be separated in high efficiency and in particular, it is appropriate for analysis of phospholipids and fat-soluble vitamins.

What is claimed is:

1. Column packings for liquid chromatography comprising porous ceramics granules which have hydrophilic surfaces prepared by the steps comprising:

(1) calcining a crystalline clay mineral having fibrous structure at a temperature of from 100°–1200° C.;

(2) treating with an acid to remove alkali metal oxides and convert a portion of crystalline $SiO^2$ in the mineral to a non-crystalline form to produce pores in the mineral of 0.1 μm or less, the amount of MgO contained in the mineral after acid treatment being 30 wt. % or less;

(3) calcining a second time at a temperature of from 100°–1200° C. to avoid any decrease in pore volume, the resultant packing having an $SiO^2$ content of 60 wt. % or more thereby rendering the packing suitable as an HPLC stationary phase.

2. The column packings for liquid chromatography of claim 1, wherein said fibrous structure is a fibrous crystal structure containing uniform size intracrystalline tunnels parallel with the fiber.

3. The column packing for liquid chromatography of claim 1, wherein median pore diameter of the porous ceramics granule is in the range of from 0.001 μm to 0.1 μm.

4. The column packings for liquid chromatography of claim 1, wherein the crystalline clay mineral is sepiolite or attapulgite.

5. The column packings for liquid chromatography of claim 1, wherein $SiO_2$ content of the porous ceramics granule is 60 wt. % or more.

6. The column packings for liquid chromatography of claim 1, wherein MgO content of the porous ceramics granule is 30 wt. % or more.

7. The column packings for liquid chromatography of claim 1, wherein $SiO_2$ content of the porous ceramics granule is 60 wt. % or more and MgO content of the porous ceramics granule is 30 wt. % or less.

* * * * *